United States Patent [19]

Nagasawa et al.

[11] 3,816,174

[45] June 11, 1974

[54] PROCESS FOR PREPARING A LACTULOSE SYRUP

[75] Inventors: Taro Nagasawa; Mamoru Tomita; Yoshitaka Tamura, all of Tokyo; Tomokazu Obayashi, Tanashi; Teruhiko Mizota, Tokyo, all of Japan

[73] Assignee: Morinaga Milk Industry Co., Ltd., Tokyo, Japan

[22] Filed: May 17, 1972

[21] Appl. No.: 254,169

[30] Foreign Application Priority Data
May 22, 1971 Japan.................................. 46-34454

[52] U.S. Cl.................... 127/42, 127/30, 127/46 R, 260/209
[51] Int. Cl.......................................... C07c 49/18
[58] Field of Search ................. 127/30, 42; 260/209

[56] References Cited
UNITED STATES PATENTS
3,514,327   5/1970   Parrish................................. 127/42

3,546,206   12/1970   Guth................................. 127/42 X

OTHER PUBLICATIONS

E. M. Montgomery, "Methods in Carbohydrate Chem.," R. L. Whistler, ed., Vol. I, 325–328, Academic Press, New York, 1962.

*Primary Examiner*—Morris O. Wolk
*Assistant Examiner*—Sidney Marantz
*Attorney, Agent, or Firm*—Oblon, Fisher, Spivak, McClelland & Maier

[57]       ABSTRACT

A lactulose syrup containing more than 80 percent lactulose in total solid content, is produced in an industrially acceptable manner by admixing an aqueous solution of lactose with an aqueous solution of sodium hydroxide containing less than 0.54 percent sodium hydroxide based on the quantity of lactose, heating said mixed solution to a temperature of above 70°C. to isomerize the lactose, and thereafter concentrating lactulose from the reaction liquid.

4 Claims, 1 Drawing Figure

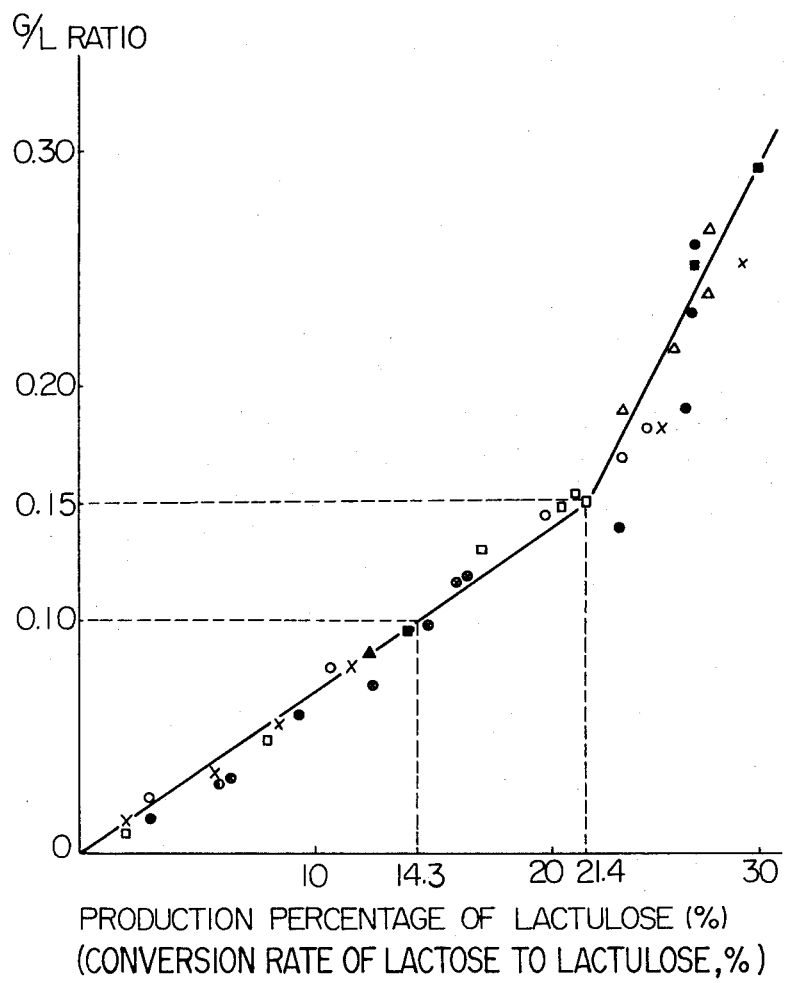

PROCESS FOR PREPARING A LACTULOSE SYRUP

BACKGROUND OF THE INVENTION

1. Field of the Invention

The present invention relates to a process for preparing a lactulose syrup.

More particularly the present invention relates to a method of forming a lactulose syrup containing greater than 80 percent lactulose, based on total solid content.

2. Description of the Prior Art

The conventional method for preparing lactulose is to add an alkali agent, such as $Ca(OH)_2$, CaO, KOH, $K_2HPO_4$, $Na_2HPO_4$ or $Ba(OH)_2 \cdot 8H_2O$ to a lactose solution in a ratio of 0.2 to 5.0 parts per 100 parts of lactose. This solution is then heated or allowed to stand at a temperature of from room temperature to 100°C. for 10 minutes to 2 days to effect isomerization of the lactose to lactulose. Generally, a yield of 15 to 40 percent, based on lactose used, of lactulose is produceable by this means. Byproducts, such as galactose, are then removed by bromolysis, electrolysis, or the like. Sodium hydroxide has also been used as the alkali agent, but in the previously reported techniques, an extremely large amount of sodium hydroxide, 2.0 to 8.34 percent, based on the weight of lactose, was required, and it was required to heat the solution to temperatures up to 100°C. for 20 seconds, or to allow the solution to stand at room temperature for up to 3 days.

No particular concern was paid, in the prior art, to the byproduct formation, since, as indicated above, such byproducts could readily be removed by known techniques. Nevertheless, the known purification techniques are somewhat complex and expensive, and hence not altogether desired.

SUMMARY OF THE INVENTION

Accordingly, one object of the present invention is to provide an industrially acceptable method for inexpensively preparing lactulose in relatively high purity, and in yields of at least 80 percent lactulose, based on the total solid content, by isomerization of lactose.

It is a major premise of this invention to obtain lactulose in high purity, whereby the amounts of galactose simultaneously formed are reduced to as great an extent as possible and to achieve a higher conversion of lactose to lactulose in the isomerization reaction. It has now been found that various factors will influence the percentages of lactulose produced and the relative ratio of galactose to lactulose produced (hereinafter referred to as G/L).

It has now been found that it is most effective and economical to employ sodium hydroxide as the alkali agent in isomerization of lactose, and that this alkali agent will reduce the extent of galactose formation, enabling a greater yield of lactulose.

It was also found that a lactulose syrup of high purity, containing relatively less byproducts, can be obtained by heating a mixture of extremely small amounts of sodium hydroxide and lactose under much less severe conditions than required by prior art methods.

According to the process of the present invention, a lactulose syrup containing above 80 percent lactulose, based on the total solid content, is prepared by admixing a sodium hydroxide solution containing from less than 0.54 percent, and preferably between 0.27 to 0.54 percent sodium hydroxide, based on the weight of lactose with an aqueous solution of lactose, heating said solution to a temperature of above 70°C. to effect isomerization of the lactose and thereafter concentrating the resulting lactulose to the desired content.

BRIEF EXPLANATION OF THE DRAWING

FIG. 1 shows the relation between the conversion rate of lactose to lactulose and the G/L ratio.

DETAILED DESCRIPTION OF THE PREFERRED EMBODIMENTS

As was described in the prior art, when lactose is isomerized with sodium hydroxide, various byproducts are produced, principally galactose, which is extremely difficult to remove by conventional means. In general, the greater the percentage of lactulose produced, the greater will be the quantity of galactose produced. Therefore, in order to obtain a lactulose syrup of high purity, the amount of galactose produced must be reduced as greatly as possible and the degree of conversion of lactose to lactulose must be maximized.

The important factor in the conversion of lactose to lactulose and the G/L ratio in the isomerization reaction of lactose are the parameters, type and quantity of alkali agent, reaction temperature, reaction time, etc. In the present invention, it has been found that when sodium hydroxide is used as the alkali agent, the G/L ratio will be reduced as compared with other alkali agents, even though the conversion of lactose to lactulose is increased. This is shown further in Table I.

The quantity of lactulose and galactose were quantitatively determined by Sweeley's method (J.A.C.S. 85, 2497, 1963), and the conversion rate of lactose to lactulose and the G/L ratio were calculated by using the following equation:

Conversion rate of lactose to lactulose $$= \frac{\text{Amount of lactulose produced}}{\text{Amount of lactose used}} \times 100$$

$$G/L \text{ ratio} = \frac{\text{Amount of galactose formed}}{\text{Amount of lactulose produced}}$$

TABLE I

| Alkali agent | | Reaction condition | | Conversion rate of lactose to lactulose % | G/L ratio |
|---|---|---|---|---|---|
| Kind | Amount used %* | Temperature °C. | Time | | |
| $Ca(OH)_2$ | 1.0 | 85 | 30 min. | 21.3 | 0.25 |
| KOH | 0.525 | 37 | 24 hours | 11.0 | 0.13 |
| $Na_2CO_3$ | 1.0 | 90 | 5 min. | 12.0 | 0.17 |
| NaOH | 0.27 | 90 | 5 min. | 14.3 | 0.10 |
| NaOH | 0.54 | 90 | 5 min. | 21.4 | 0.15 |

*Percentage based on the amount of lactose used.

As will be apparent from Table I, if sodium hydroxide is used, the amount of galactose formed will be equivalent to 60 percent of that obtained when calcium hydroxide is used. Moreover, the quantity of sodium hydroxide used may be about ½ of that of the calcium hydroxide, even though both cases have comparable lactose conversion rates.

In tests using aqueous solutions containing 0.1 to 1.5 percent sodium hydroxide, based on the weight of lactose and commercially available edible lactose in a concentration of 30% (W/W), the mixed solution was heated to 90°C. for varying periods of from 30 seconds to 5 minutes. The galactose and lactulose content in the reaction solutions were quantitatively determined, and the degree of conversion of lactose to lactulose and the G/L ratio were calculated from these values. The results are shown in FIG. 1.

As will be apparent, regardless of the amount of sodium hydroxide admixed with aqueous lactose solution, the relation between the yield of lactulose and the G/L ratio rose with an inflection point when the degree of lactulose conversion was above 21.4 percent. Therefore, in order to convert lactose to lactulose in as high a degree as possible, and to reduce the GL ratio, the former must be below 21.4 percent and the latter must be below 0.15. That is, lactulose syrup of high purity, containing more than 80 percent lactulose based on the total solid content, can be prepared if the sodium hydroxide is used in an amount of less than that corresponding to the inflection point of the curve, since the G/L ratio will be 0.15 at the inflection point. However, as should be apparent, the conversion rate of lactose drops if the G/L ratio is small, which would thus require complicated concentration procedures to obtain a lactulose syrup of high purity. Therefore, in order to obtain a lactulose syrup of high purity, containing more than 80 percent lactulose, based on the total solid content, the G/L ratio should be above 0.1, i.e., the conversion rate of lactose to lactulose should desirably be above 14.3 percent. The quantity of sodium hydroxide which will satisfy these conditions calculates out to be 0.27 to 0.54 percent, based on the quantity of lactose used. That is, the amount of sodium hydroxide used in the above described test and the maximum conversion rate of lactose to lactulose are as shown in Table II. The relation between conversion rate of lactose to lactulose and the amount of sodium hydroxide is expressed by the equation (1).

TABLE II

| Amount of NaOH used (% based on lactose) | Maximum conversion rate of lactose to lactulose, % |
|---|---|
| 0.1 | 6.0 |
| 0.166 | 9.8 |
| 0.27 | 14.3 |
| 0.333 | 16.7 |
| 0.54 | 21.4 |
| 0.666 | 22.9 |
| 0.835 | 24.7 |
| 1.0 | 25.8 |
| 1.166 | 26.3 |
| 1.33 | 28.0 |
| 1.50 | 28.5 |

Conversion rate of lactose to lactulose, percent $$= 30 \left\{ 1 - \frac{1}{1 + 6.15(NaOH\%)1.45} \right\} \quad (1)$$

From the equation (1) and the desired range, i.e., 14.3 to 21.4 percent lactose, based on the above described conversion rate, the amount of sodium hydroxide most suitable for carrying out the present invention becomes:

$$14.3 \leq \left\{ 1 - \frac{1}{1 + 6.15(NaOH\%)1.45} \right\} \leq 21.4,$$

which calculates out to be 0.27 to 0.54 percent.

As described above, when using sodium hydroxide in an amount of less than 0.54 percent based on the weight of lactose, a syrup containing more than 80 percent lactulose can be prepared by concentrating lactulose from the reaction liquid, regardless of the concentration of lactose in the aqueous solution, the heating temperature or the heating time. It is most practical to isomerize lactose in a production rate of 14.3 to 21.4 percent of lactulose and a G/L ratio of 0.10 to 0.15.

The mixed solution of the aqueous lactose solution and the sodium hydroxide solution is preferably heated to a temperature of above 70°C.

The velocity of the isomerization reaction will increase with increasing temperature so that the reaction time can be shortened by using elevated temperatures. At temperatures less than 70°C., the reaction time must be extended over an unacceptably long period. In order to complete the reaction within a short period of time, temperatures as high as 130°C. are preferable. Under these conditions, a continuous production is possible. The sodium hydroxide used is desirably added to the aqueous solution as an aqueous solution having a concentration of 2 to 10 percent. If the concentration of the sodium hydroxide in the solution is too high, the reaction liquid will have local high alkaline concentrations. The isomerization reaction will not proceed as rapidly as would otherwise be expected, and additional concentrating will be required.

The aqueous lactose solution is preferably mixed with the sodium hydroxide solution at a temperature of less than 70°C. in order to conduct the reaction in a uniform manner. After heating, the reaction liquid may be treated with an ion exchange resin for purification, if necessary.

In the process of the present invention, any method can be used for concentrating the lactulose from the reaction liquid. For example, suitable methods include crystallization, which comprises concentrating the reaction liquid and then cooling it to crystallize lactose. Other methods include adding quick lime to the reaction liquid to form an insoluble compound of lactulose which can be easily separated by the decomposition of the precipitate (Japanese Patent Publication Gazette No. 16936/1971). Still other suitable methods include extraction removal of the lactose from the reaction liquid using a solvent, such as methanol, or the like. Lactose crystallization has proven to be most effective from the point of view of ease of operation and expense.

The effects obtained by the process of the present invention are as follows:

1. The G/L ratio can be determined within the range of 0.10 to 0.15.;
2. Purification such as decolorization, desalting, etc. can be very easily carried out since the amount of sodium hydroxide used is small as compared with the prior art methods;
3. A syrup containing more than 80 percent lactulose based on the total solid content, can be obtained by merely removing lactose remaining in the reaction liquid after heating by ordinary crystallization separation techniques;
4. A lactulose syrup of high purity can be very easily obtained without the need of any special equipment since only a small amount of sodium hydroxide is used; and 5. The manufacturing process can be easily controlled and a constant quality of lactulose syrup can be prepared since the production percentage of lactulose and G/L ratio can always be maintained constant regardless of the concentration if aqueous lactose solution used, and regardless of the heating time and heating temperature, so long as the ratio of the sodium hydroxide to the lactose is maintained constant.

Having now generally described the invention, a further understanding can be obtained by reference to certain specific Examples which are provided herein for purposes of illustration only and are not intended to be limiting in any manner unless otherwise so specified.

EXAMPLE 1

100 kg. of commercially available edible lactose was dissolved in 200 kg. of hot water heated to 90°C. 540 g. of sodium hydroxide was dissolved in 15 kg. of water. The alkali solution was mixed with the aqueous lactose solution. The mixed solution was heated to 90°C. for more than 5 minutes and cooled to about 30°C. Next, the reaction liquid was desalted and decolorized with a cation exchange resin and an anion exchange resin. Thereafter, the liquid was concentrated to 60 to 70 percent in solid content and the lactose crystallized and filtered out three times to finally obtain 38.8 kg. of lactulose syrup in a solid content of 69 percent.

The lactulose syrup contained 80 percent lactulose and 12 percent galactose in solid content and had a ratio of galactose to lactulose of 0.15.

EXAMPLE 2

100 kg. of commercially available edible lactose was dissolved in 300 kg. of water heated to 70°C. 268 g. of sodium hydroxide was dissolved in 10 kg. of water. The alkali solution was mixed with the aqueous lactose solution. The mixed solution was heated to 70°C. for 30 minutes and cooled to about 30°C. using a plate cooler. Next, the reaction liquid was desalted and decolorized using a cation exchange resin and an anion exchange resin. Thereafter, the reaction liquid was concentrated to a solid content of 60 percent, allowed to stand at 30°C. for 4 hours, and lactose crystals were filtered out. The filtrate was concentrated to a solid content of 70 percent, allowed to stand at 10°C. for 12 hours, and lactose crystals were filtered out. The filtrate was concentrated to a solid content of 73 percent, allowed to stand at 10°C. for 3 days, and the lactose crystals were filtered out to obtain 24.6 kg. of lactulose syrup containing 70 percent lactulose based on the total solid content. The syrup contained 83 percent lactulose and 8.3 percent galactose in total solid content, and had a ratio of galactose to lactulose of 0.10.

EXAMPLE 3

100 kg. of commercially available edible lactose was dissolved in 200 kg. of hot water heated to 90°C. 400 g. of sodium hydroxide were dissolved in 20 kg. of water. The alkali solution was mixed with the aqueous lactose solution. The mixed solution was introduced into a plate type pasteurizer and heated to 95°C. The reaction liquid was maintained in a holding tank for 3 minutes and, after cooling to 30°C. using a plate cooler, was desalted and decolorized using a cation exchange resin and an anion exchange resin. Thereafter, the reaction liquid was concentrated to a solid content of 60 – 70 percent and the lactose was crystallized and filtered out. This step was repeated three times to obtain 33.1 kg. of a 65 percent lactulose syrup, based on the total solid content. The syrup contained 81.5 percent lactulose and 10.6 percent galactose in solid content, and had a galactose to lactulose ratio of 0.13.

Having now fully described the invention, it will be apparent to one of ordinary skill in the art that many changes and modifications can be made thereto without departing from the spirit or scope of the invention as set forth herein. Accordingly,

What is claimed and intended to be covered by letters patent is:

1. A process for preparing a lactulose syrup containing greater than 80 percent by weight lactulose, based on the total solid content, which comprises admixing an aqueous lactose solution with an aqueous sodium hydroxide solution containing from 0.27 to 0.54 percent of sodium hydroxide, based on the weight of lactose, and heating said mixed solution to a temperature of from 70°C. to 130°C. to effect isomerization of the lactose to lactulose.

2. The process of claim 1, wherein the sodium hydroxide solution used has a concentration of 2 to 10 percent, by weight.

3. The process of claim 1, wherein the resulting lactulose solution is concentrated by separation of unreacted lactose from the reaction mixture.

4. The process of claim 3, wherein the separation of said lactose is effected by selective crystallization.

* * * * *

UNITED STATES PATENT OFFICE
CERTIFICATE OF CORRECTION

Patent No. 3,816,174          Dated June 11, 1974

Inventor(s) Taro Nagasawa et al.

It is certified that error appears in the above-identified patent and that said Letters Patent are hereby corrected as shown below:

Column 3, lines 55 and 56, equation (1) should appear as shown below:

$$\left\{1 - \frac{1}{1 + 6.15(\text{NaOH\%})^{1.45}}\right\}$$

Signed and sealed this 15th day of October 1974.

(SEAL)
Attest:

McCOY M. GIBSON JR.
Attesting Officer

C. MARSHALL DANN
Commissioner of Patents